US012073081B2

(12) United States Patent
Alkalay et al.

(10) Patent No.: US 12,073,081 B2
(45) Date of Patent: Aug. 27, 2024

(54) PRIORITY BASED RAID (REDUNDANT ARRAY OF INDEPENDENT DISKS) REBUILD FOR A DATA STORAGE SYSTEM

(71) Applicant: Dell Products L.P., Round Rock, TX (US)

(72) Inventors: Amitai Alkalay, Kadima (IL); Amihay Azruel, Raanana (IL); Lior Kamran, Richon LeZion (IL)

(73) Assignee: Dell Products L.P., Round Rock, TX (US)

( * ) Notice: Subject to any disclaimer, the term of this patent is extended or adjusted under 35 U.S.C. 154(b) by 59 days.

(21) Appl. No.: 18/070,664

(22) Filed: Nov. 29, 2022

(65) Prior Publication Data

US 2024/0176489 A1 May 30, 2024

(51) Int. Cl.
*G06F 3/06* (2006.01)
(52) U.S. Cl.
CPC .......... *G06F 3/0611* (2013.01); *G06F 3/0647* (2013.01); *G06F 3/0689* (2013.01)
(58) Field of Classification Search
CPC ..... G06F 3/0611; G06F 3/0647; G06F 3/0689
See application file for complete search history.

(56) References Cited

U.S. PATENT DOCUMENTS

| | | | |
|---|---|---|---|
| 10,642,690 B1 * | 5/2020 | Tian | G06F 3/061 |
| 11,093,329 B1 | 8/2021 | Kotzur et al. | |
| 11,256,447 B1 | 2/2022 | Pang et al. | |
| 11,442,809 B1 | 9/2022 | Nguyen | |
| 11,563,450 B1 | 1/2023 | Kanter et al. | |
| 2012/0084600 A1 * | 4/2012 | Kidney | G06F 11/1088 714/6.13 |
| 2021/0216418 A1 * | 7/2021 | Han | G06F 3/0644 |

* cited by examiner

*Primary Examiner* — Gurtej Bansal
(74) *Attorney, Agent, or Firm* — BainwoodHuang

(57) ABSTRACT

Non-volatile data storage of a data storage system is organized into multiple RAID extents. Each RAID extent contains multiple logically contiguous RAID stripes. In response to detecting a failed drive in the data storage system, an initial rebuilding pass is performed on each one of the RAID extents. The initial rebuilding pass recovers data that was previously stored on the failed drive and was located within high priority RAID stripes in the RAID extent. After the initial rebuilding pass is completed on all of the RAID extents, at least one subsequent rebuilding pass is performed on each one of the RAID extents. The subsequent rebuilding pass recovers data that was previously stored on the failed drive and was located within RAID stripes in the RAID extent that are not high priority.

16 Claims, 5 Drawing Sheets

PRIORITY BASED RAID (REDUNDANT ARRAY OF INDEPENDENT DISKS) REBUILD FOR A DATA STORAGE SYSTEM

TECHNICAL FIELD

The present disclosure relates generally to data storage systems that support RAID (Redundant Array of Independent Disks) technology.

BACKGROUND

Data storage systems are arrangements of hardware and software that are coupled to non-volatile data storage drives, such as solid state drives and/or magnetic disk drives. The data storage system services host I/O requests received from physical and/or virtual host machines ("hosts"). The host I/O requests received by the data storage system specify host data that is written and/or read by the hosts. The data storage system executes software that processes the host I/O requests by performing various data processing tasks to efficiently organize and persistently store the host data in the non-volatile data storage drives of the data storage system.

Data storage systems may support RAID (Redundant Array of Independent Disks) technology. Data striping is a RAID process that stores consecutive segments of logically contiguous data and associated parity information across multiple different disk drives, in sets of data and associated parity that together are referred to as RAID stripes. The parity information stored in a given RAID stripe enables the recovery of data within the stripe that later becomes unavailable, e.g. as a result of the failure or removal of one or more of the disk drives. A RAID rebuild process may be initiated following the failure or removal of one or more disk drives to recover the unavailable data previously located on the unavailable drive(s) using the data stored on the remaining drives together with the parity information contained within each stripe.

SUMMARY

In the disclosed technology, non-volatile data storage of a data storage system is organized into RAID extents. Each RAID extent contains multiple logically contiguous RAID stripes. In response to detecting a failed drive in the data storage system, an initial rebuilding pass is performed on each one of the RAID extents. The initial rebuilding pass recovers data that was previously stored on the failed drive and was located within high priority RAID stripes in the RAID extent. After the initial rebuilding pass is completed on all of the RAID extents, at least one subsequent rebuilding pass is performed on each one of the RAID extents. The subsequent rebuilding pass recovers data that was previously stored on the failed drive and was located within RAID stripes in the RAID extents that are not high priority.

In some embodiments, for each RAID stripe in each RAID extent, a corresponding high priority block counter is maintained. The high priority block counter stores a value equal to a total number of high priority blocks that are stored in the corresponding RAID stripe. For each RAID stripe in each RAID extent, a value of the corresponding high priority block counter is compared to a threshold. A determination is then made that those RAID stripes having corresponding high priority block counter values that exceed the threshold are high priority.

In some embodiments, for each block stored in each RAID stripe, a corresponding high priority block flag may be maintained. The high priority block flag is set when high priority user data is stored in the corresponding block, and otherwise clear. Maintaining the corresponding high priority block counter for each RAID stripe in each RAID extent may include storing, in the high priority block counter, a total number of blocks stored in the RAID stripe that have corresponding high priority block flags that are currently set.

In some embodiments, for each RAID extent, a corresponding high priority recovered flag may be maintained. The high priority recovered flag is set when all data that was previously stored on the failed drive and that was located within all high priority RAID stripes in the RAID extent has been recovered during a RAID rebuild process. Read requests received during the RAID rebuild process (e.g. prior to completion of the at least one subsequent rebuilding pass on each one of the RAID extents), and that are directed to high priority RAID stripes in RAID extents having corresponding high priority recovered flags that are set, are processed by reading the recovered data from the high priority RAID stripes.

In some embodiments, high priority tags may be generated for and associated with write operations that write high priority data. Maintaining the high priority block flag for each block in each RAID stripe may include setting high priority block flags corresponding to blocks written by write operations for which high priority tags were generated.

In some embodiments, generating the high priority tags for write operations that write high priority data includes generating high priority tags for write operations that write user data to high priority storage volumes.

In some embodiments, generating the high priority tags for write operations that write high priority data includes generating high priority tags for write operations that write metadata.

In some embodiments, determining that those RAID stripes having corresponding high priority block counter values that exceed the threshold are high priority is performed when data for individual RAID stripes are de-staged (e.g. from cache or by the garbage collection process) to non-volatile storage.

In some embodiments, a bitmap is maintained corresponding to each RAID extent indicating which individual RAID stripes in the corresponding RAID extent have been determined to be high priority. Further in response to detecting the failed drive, a copy (a "frozen" copy) is created of each bitmap corresponding to each RAID extent. The copy of the bitmap is not modified during the initial rebuilding pass and subsequent rebuilding pass, The bitmap corresponding to each RAID extent, indicating which individual RAID stripes in the RAID extent have been determined to be high priority, is modified during the initial rebuilding pass and subsequent rebuilding pass to reflect changes to the priorities of RAID stripes occurring during the RAID rebuild process. The initial rebuilding pass that recovers data that was previously stored on the failed drive and was located within high priority RAID stripes in each RAID extent is performed using the copies of the bitmaps corresponding to the individual RAID extents to identify which individual RAID stripes are high priority within each RAID extent. The copies of the bitmaps are deleted responsive to completion of the first rebuilding pass and the subsequent rebuilding pass on the corresponding RAID extents.

In some embodiments, RAID stripes that are high priority are preferentially merged together during garbage collection.

In some embodiments, the high priority block counter corresponding to at least one RAID stripe is decremented responsive to a block in the RAID stripe being overwritten that corresponds to a currently set high priority block flag.

The disclosed technology is integral to providing a practical technical solution to shortcomings of other technologies. For example, the disclosed technology provides a practical solution to the problem of degraded storage system performance while processing read requests for high priority data (e.g. high priority storage volumes and/or metadata) that are received during the rebuild process. In the disclosed technology, prioritized recovery of data in RAID stripes identified as high priority in the disclosed initial rebuilding pass improves the likelihood that read requests for high priority data received during the rebuilding process will not require time consuming in-line rebuilding of the data being read, thus reducing delays in the processing of such read requests. In the case where the high priority data recovered during the initial rebuilding pass includes or consists of metadata, the performance improvement extends to read requests for other data that requires use of the rebuilt metadata to service the requests.

In addition, recovery of high priority data during the initial rebuilding pass reduces the time period during which high priority data is exposed to the risk of data loss resulting from additional drive failures occurring during the rebuild process, thus improving data resiliency for the high priority data. Again, in the case where the high priority data recovered during the initial rebuilding pass includes or consists of metadata, the improved resiliency may extend to data that requires use of the rebuilt metadata to be read.

BRIEF DESCRIPTION OF THE DRAWINGS

The objects, features and advantages of the disclosed technology will be apparent from the following description of embodiments, as illustrated in the accompanying drawings in which like reference numbers refer to the same parts throughout the different views. The drawings are not necessarily to scale, emphasis instead being placed on illustrating the principles of the disclosed technology.

DETAILED DESCRIPTION

Figure 1:
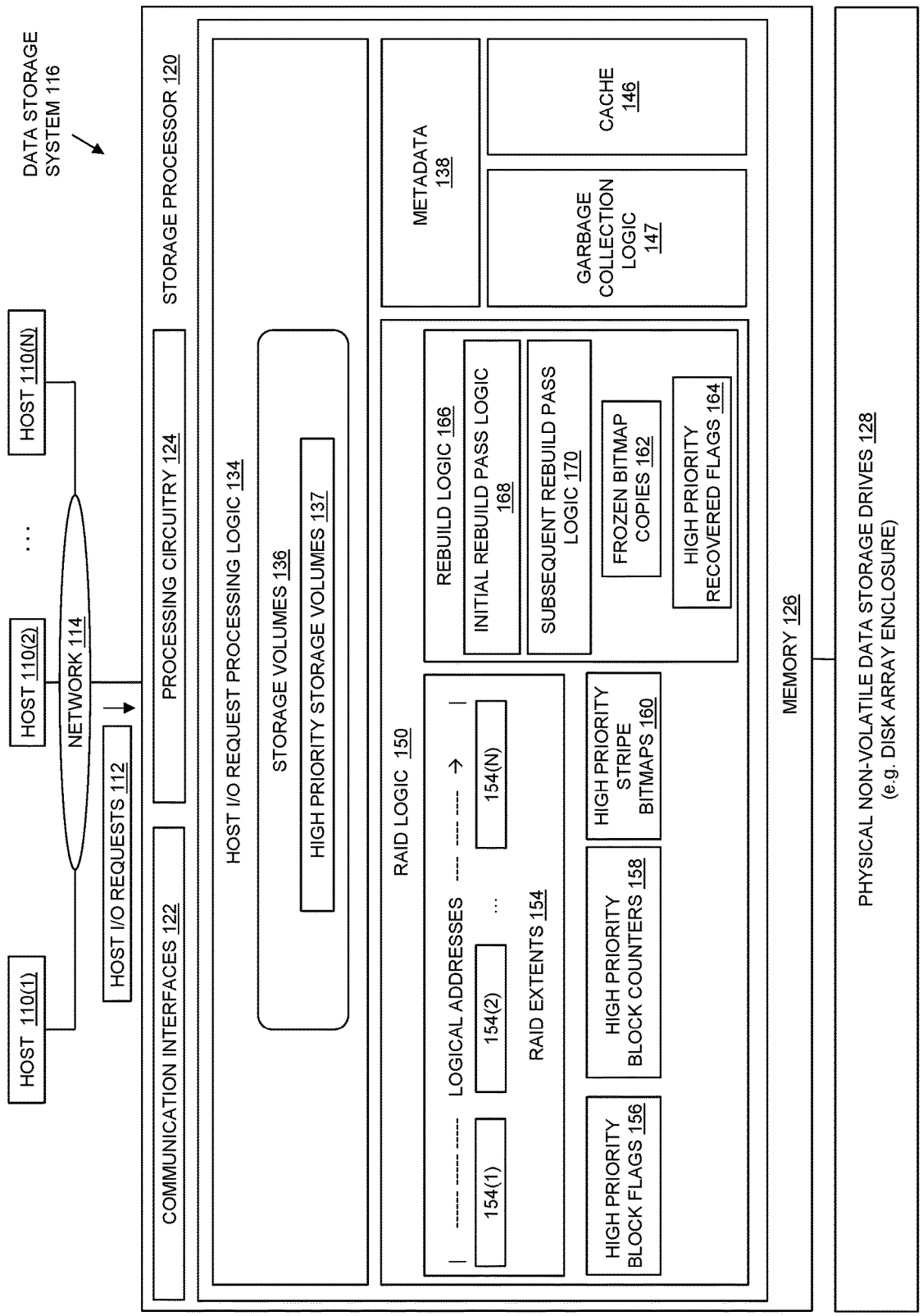
FIG. 1 is a block diagram showing an example of a data storage system including an illustrative embodiment of the disclosed technology.

Embodiments of the invention will now be described with reference to the figures. The embodiments described herein are provided only as examples, in order to illustrate various features and principles of the disclosed technology, and the invention is broader than the specific embodiments described herein.

Embodiments of the disclosed technology are integrated into a practical solution for processing read requests for high priority data (e.g. high priority storage volumes and/or metadata) with reduced delays during a rebuild process. In the disclosed technology, non-volatile data storage is organized into multiple RAID extents, each of which contains multiple logically contiguous RAID stripes. When a failed drive is detected, an initial rebuilding pass is performed on each RAID extent that recovers data previously stored on the failed drive and located within high priority RAID stripes. At least one subsequent rebuilding pass is then performed on each RAID extent that recovers data previously stored on the failed drive and located within RAID stripes that are not high priority.

A high priority block counter may be maintained for each RAID stripe, storing a value equal to a total number of high priority blocks in the RAID stripe. A value of each high priority block counter is compared to a threshold, and those RAID stripes having high priority block counter values exceeding the threshold are determined to be high priority RAID stripes.

A high priority block flag may be maintained for each block of data stored in each RAID stripe, and set if high priority data is stored in the block. The high priority block counter for each RAID stripe may store a total number of blocks in that RAID stripe that have currently set corresponding high priority block flags.

A corresponding high priority recovered flag may be maintained for each RAID extent, and set when all data that was previously stored on the failed drive and located within all the high priority RAID stripes in that RAID extent has been recovered. Read requests received during the RAID rebuild process and directed to high priority RAID stripes in RAID extents having corresponding high priority recovered flags that are set may advantageously be processed by reading the recovered data from the high priority RAID stripes.

High priority tags may be generated for write operations that write high priority data. The high priority block flags for each RAID stripe may be maintained by setting the high priority block flags corresponding to blocks written by write operations that were tagged as high priority. For example, high priority tags may be generated for write operations that write user data to high priority storage volumes. High priority tags may also or alternatively be generated for write operations that write metadata.

The identification of RAID stripes having high priority block counter values that exceed the threshold as high priority may be performed when data for individual RAID stripes is de-staged (e.g. from data storage system cache or the garbage collection process) to non-volatile storage, and a high priority stripe bitmap may be generated for each RAID extent indicating which individual RAID stripes in the RAID extent are high priority. In response to detecting a failed drive, a frozen copy may be created of each high priority stripe bitmap corresponding for each RAID extent. The frozen copy is not modified during either the initial rebuilding pass or subsequent rebuilding pass, while the original high priority stripe bitmap may be modified, e.g. by writes of high priority data occurring during the initial rebuilding pass and subsequent rebuilding pass. The initial rebuilding pass that recovers data previously stored on the failed drive and located within high priority RAID stripes in each RAID extent uses the frozen copies of the high priority stripe bitmaps to identify which individual RAID stripes are high priority within each RAID extent.

In response to a block in a RAID stripe being overwritten that corresponds to a currently set high priority block flag, the high priority block counter corresponding to the RAID stripe may be decremented.

In some embodiments, RAID stripes that are high priority may preferentially be merged together during the garbage collection process.

FIG. 1 is a block diagram showing an operational environment for the disclosed technology, including an example of a data storage system in which the disclosed technology is embodied. FIG. 1 shows a number of physical and/or virtual Host Computing Devices 110, referred to as "hosts", and shown for purposes of illustration by Hosts 110(1) through 110(N). The hosts and/or applications executing thereon issue Host I/O Requests 112 (e.g. host I/O read requests and host I/O write requests) that access non-volatile data storage provided by Data Storage System 116. For example, Host I/O Requests 112 are issued by the hosts to Data Storage System 116 over one or more networks, such as a local area network (LAN), and/or a wide area network (WAN) such as the Internet, etc., and shown for purposes of illustration in FIG. 1 by Network 114. Alternatively, or in addition, one or more of Hosts 110(1) and/or applications accessing non-volatile data storage provided by Data Storage System 116 may execute within Data Storage System 116.

Data Storage System 116 includes at least one Storage Processor 120 that is communicably coupled to both Network 114 and Physical Non-Volatile Data Storage Drives 128, e.g. at least in part though one or more Communication Interfaces 122. No particular hardware configuration is required, and Storage Processor 120 may be embodied as any specific type of device that is capable of processing host input/output (I/O) requests (e.g. I/O read and I/O write requests, etc.), and of persistently storing host data.

The Physical Non-Volatile Data Storage Drives 128 may include physical data storage drives such as solid state drives, magnetic disk drives, hybrid drives, optical drives, and/or other specific types of drives. In some embodiments, Physical Non-Volatile Data Storage Drives 128 may consist of or include a disk array enclosure or the like.

A Memory 126 in Storage Processor 120 stores program code that is executed on Processing Circuitry 124, as well as data generated and/or processed by such program code. Memory 126 may include volatile memory (e.g. RAM), and/or other types of memory.

Memory 126 may include and/or be communicably coupled with a Cache 146. Cache 146 may be used to cache host data received by Storage Processor 120 from Hosts 110 (e.g. host data indicated in I/O write requests). Host data stored in Cache 146 is flushed ("de-staged") from time to time from Cache 146 into Physical Non-Volatile Data Storage Drives 128.

Processing Circuitry 124 may include or consist of one or more processor cores ("processors"), e.g. within one or more multi-core processor packages. Each processor core may include or consist of a processing unit, made up of electronic circuitry that is capable of executing instructions.

Processing Circuitry 124 and Memory 126 together form electronic control circuitry that is configured and arranged to carry out various methods and functions described herein. The Memory 126 stores a variety of software components that may be provided in the form of executable program code. For example, Memory 126 may include software components such as Host I/O Request Processing Logic 134, RAID Logic 150, and Garbage Collection Logic 147. When instructions of the program code stored in Memory 126 is executed by Processing Circuitry 124, Processing Circuitry 124 is caused to carry out the operations of the software components described herein. Although certain software components are shown in the Figures and described herein for purposes of illustration and explanation, those skilled in the art will recognize that Memory 126 may also include various other specific types of software components.

In the example of FIG. 1, Storage Processor 120 receives Host I/O Requests 112, and Host I/O Request Processing Logic 134 processes Host I/O Requests 112. Host I/O Request Processing Logic 134 uses portions of the non-volatile data storage in Physical Non-Volatile Data Storage Drives 128 to create Storage Volumes 136 that are accessed by the Host I/O Requests 112. Storage Volumes 136 store user data specified by Host I/O Requests 112. Some of the Storage Volumes 136 may store high priority data, and may accordingly be assigned (e.g. by the hosts, or by Host I/O Request Processing Logic 134) a relatively higher priority than other storage volumes. Such relatively higher priority storage volumes are shown in FIG. 1 by High Priority Storage Volumes 137.

During operation of the components shown in the illustrative embodiment of FIG. 1, In the disclosed technology, RAID Logic 150 organizes the non-volatile data storage of the Physical Non-Volatile Data Storage Drives 128 into RAID Extents 154. RAID Extents 154 include N RAID extents, shown by RAID Extent 154(1), RAID Extent 154(2), and so on through RAID(N). The RAID Extents 154 extend across a logical address space used by RAID Logic 150 and/or Host I/O Request Processing Logic 134 to access the non-volatile data storage of Physical Non-Volatile Data Storage Drives 128 when persistently storing and subsequently retrieving host data indicated by Host I/O Requests 112. Each RAID extent in RAID Extents 154 contains multiple logically contiguous RAID stripes.

In response to detection of a failed drive in Physical Non-Volatile Data Storage Drives 128, e.g. by RAID Logic 150, a RAID rebuild process is performed in which Initial Rebuild Pass Logic 168 performs an initial rebuilding pass on each individual one of the RAID extents in RAID Extents 154. During the initial rebuilding pass, for each one of the RAID extents, Initial Rebuild Pass Logic 169 recovers only data that was both i) previously stored on the failed drive and ii) located within the high priority RAID stripes in the RAID extent, on a per-RAID stripe basis, using data stored on the remaining non-failed drives and parity information stored within the RAID stripes.

After Initial Rebuild Pass Logic 169 completes the initial rebuilding pass on all of the RAID extents, Subsequent Rebuild Pass Logic 170 performs at least one subsequent rebuilding pass is performed on each one of the RAID extents in RAID Extents 154. During the subsequent rebuilding pass, for each one of the RAID extents, Subsequent Rebuild Pass Logic 170 recovers data that was both i) previously stored on the failed drive and ii) located within RAID stripes in the RAID extent that are not high priority, on a per-RAID stripe basis, using data stored in the remaining non-failed drives and parity information stored within the RAID stripes.

For each RAID stripe in each one of the RAID extents in RAID Extents 154, RAID Logic 150 maintains a corresponding high priority block counter, as shown by High Priority Block Counters 158. High Priority Block Counters 158 are maintained such that each high priority block counter stores a value equal to a total number of high priority blocks that are stored in the corresponding RAID stripe. Further during operation, for each individual RAID stripe in each one of the RAID extents in RAID Extents 154, RAID Logic 150 compares a value of the corresponding high priority block counter in High Priority Block Counters 158 to a predetermined threshold. For example, the predetermined threshold may be a total number of blocks corresponding to a predetermined percentage (e.g. 50%) of the RAID stripe's capacity. RAID Logic 150 determines that those RAID stripes having corresponding high priority block counters with values that exceed the pre-determined threshold are high priority RAID stripes.

For each block of data stored in each RAID stripe, RAID Logic 150 may maintain a corresponding high priority block flag may be maintained in High Priority Block Flags 156. A given high priority block flag is set by RAID Logic 150 in response to high priority user data being stored in the corresponding block of a RAID stripe. Using High Priority Block Flags 156, RAID Logic 150 may maintain the corresponding high priority block counter for each RAID stripe in each one of the RAID extents in RAID Extents 154 by storing, in the high priority block counter, a total number of blocks of high priority data that are stored in the corresponding RAID stripe, e.g. the total number of high priority block flags in High Priority Block Flags 156 that are currently set for blocks stored in the corresponding RAID stripe.

In some embodiments, RAID Logic 150 may decrement the high priority block counter in High Priority Block Counters 158 corresponding to a RAID stripe in response to a block in that RAID stripe being overwritten in the case where the block being overwritten corresponds to a currently set high priority block flag in the high priority block flags for that RAID stripe.

During the RAID rebuild process, for each individual RAID extent in RAID Extents 154, Rebuild Logic 166 may maintain a corresponding high priority recovered flag in High Priority Recovered Flags 164. Rebuild Logic 166 sets a given high priority recovered flag for a given RAID extent during the RAID rebuild process when all data that was previously stored on the failed drive and that was located within all high priority RAID stripes in that RAID extent has been recovered, e.g. during the initial rebuilding pass when Initial Rebuild Pass Logic 168 has recovered all data stored on the failed drive that is located within the high priority RAID stripes of the RAID extent.

Host I/O read requests that are received by Data Storage System 116 during the RAID rebuild process (e.g. prior to completion of the at least one subsequent rebuilding pass on each one of the RAID extents), and that are directed to high priority RAID stripes in RAID extents having corresponding high priority recovered flags that are set in High Priority Recovered Flags 164, are advantageously processed by RAID Logic 150 reading the recovered data from the high priority RAID stripes. Such operation avoids the delays associated with recovering data previously stored on the failed disk at the time the host I/O read requests are processed for data stored in high priority RAID stripes in RAID extents having corresponding high priority recovered flags that are set.

Hosts 110 and/or Data Storage System 116 may generate high priority tags for write operations that write high priority data indicated that is indicated by one or more host I/O write requests. RAID Logic 150 may then maintain the high priority block flag for the blocks stored in each RAID stripe by setting high priority block flags corresponding to blocks written by write operations for which high priority tags were generated. For example, high priority tags may be generated for write operations that write high priority data by Hosts 110 or Host I/O Request Processing Logic 134 generating high priority tags for write operations that write user data to High Priority Storage Volumes 137. Alternatively, or in addition, high priority tags may be generated for write operations that write Metadata 138. For example, in some embodiments, a network attached storage (NAS) application or the like executing in the Data Storage System 116 (e.g. a containerized application executing in Host I/O Request Processing Logic 134) may include a file storage interface to the hosts, may store both data and metadata through a block storage interface provided by Host I/O Request Processing Logic 134, and may provide tagging capabilities to allow differentiation between metadata and data that it stores.

In embodiments in which high priority tags are generated for write operations that write Metadata 138, and where Metadata 138 includes host application metadata, the prioritization of rebuilding the host application metadata may be beneficial from a data storage system performance perspective and from a data resiliency perspective. From a performance perspective, data storage system performance may be improved in such embodiments because metadata is typically required to be read first in order to service host I/O requests, and accordingly the initial rebuilding of the metadata by Initial Rebuild Pass Logic 168 may improve (i.e., reduce) read latency. From a resiliency perspective, data storage system resiliency may be improved in such embodiments because metadata corruption may prevent access to large amounts of data, and because rebuilding metadata relatively faster may reduce the amount of unrecoverable data resulting from additional failures occurring during the rebuild process.

In embodiments in which high priority tags are generated for write operations that write High Priority Storage Volumes 137, Hosts 110 may define which specific volumes are to be considered High Priority Storage Volumes 137, e.g. through a Quality of Service (QOS) policy or the like defined by Hosts 110, resulting in relatively faster rebuilding of the data stored to those host-indicated high-priority volumes by the disclosed technology.

In some embodiments, RAID Logic 150 determines that those RAID stripes having corresponding high priority block counter values in High Priority Block Counters 158 that exceed the threshold are high priority are high priority RAID stripes when data for individual ones of the RAID stripes in the RAID Extents 154 are de-staged from the Storage Processor 120 to Physical Non-Volatile Data Storage Drives 128. For example, de-staging of RAID stripes may occur when individual RAID stripes are flushed from Cache 146 to Physical Non-Volatile Data Storage Drives 128.

In another example, de-staging of RAID stripes may occur when the Garbage Collection Logic 147 moves new RAID stripes that were generated by Garbage Collection Logic 147 from Storage Processor 120 to Physical Non-Volatile Data Storage Drives 128. Garbage Collection Logic 147 performs a garbage collection process that merges together the data stored in partially utilized RAID stripes in RAID Extents 154 to generate new, more fully-utilized RAID stripes, and then freeing the resources of the partially utilized RAID stripes for re-allocation. In some embodiments, Garbage Collection Logic 147 preferentially merges together data from partially utilized RAID stripes that are high priority during the garbage collection process, in order to form new RAID stripes, prior to merging together data from partially utilized RAID stripes that are not high priority.

In some embodiments, RAID Logic 150 maintains a high priority stripe bitmap corresponding to each RAID extent in RAID Extents 154, shown in FIG. 1 by High Priority Stripe Bitmaps 160. Each high priority stripe bitmap indicates which individual RAID stripes have been determined to be high priority in the corresponding RAID extent. For example, set bits in a high priority stripe bitmap may indicate the positions of the high priority stripes in the corresponding RAID extent.

In response to detecting a failed drive in Physical Non-Volatile Data Storage Drives 128, Rebuild Logic 166 creates a frozen copy of each bitmap corresponding to each RAID extent, as shown in FIG. 1 by High Priority Recovered Flags 164. The frozen copies of the high priority stripe bitmaps are not modified during the RAID rebuild process, i.e. during the initial rebuilding pass and subsequent rebuilding pass. In contrast, the high priority stripe bitmaps in High Priority Stripe Bitmaps 160 may be modified during the rebuild process to reflect changes to the priorities of RAID stripes occurring during the RAID rebuild process, e.g. to set bits corresponding to RAID stripes determined to be high priority during the rebuild process. The initial rebuilding pass performed by Initial Rebuild Pass Logic 168 determines the high priority RAID stripes in each RAID extent, for which data previously stored on the failed drive is to be rebuilt during the initial rebuilding pass, using the frozen bitmap copies in Frozen Bitmap Copies 162. After the subsequent rebuilding pass is completed on all the RAID extents in RAID Extents 154, Rebuild Logic 154 may delete the frozen bitmap copies in Frozen Bitmap Copies 162.

Figure 2:
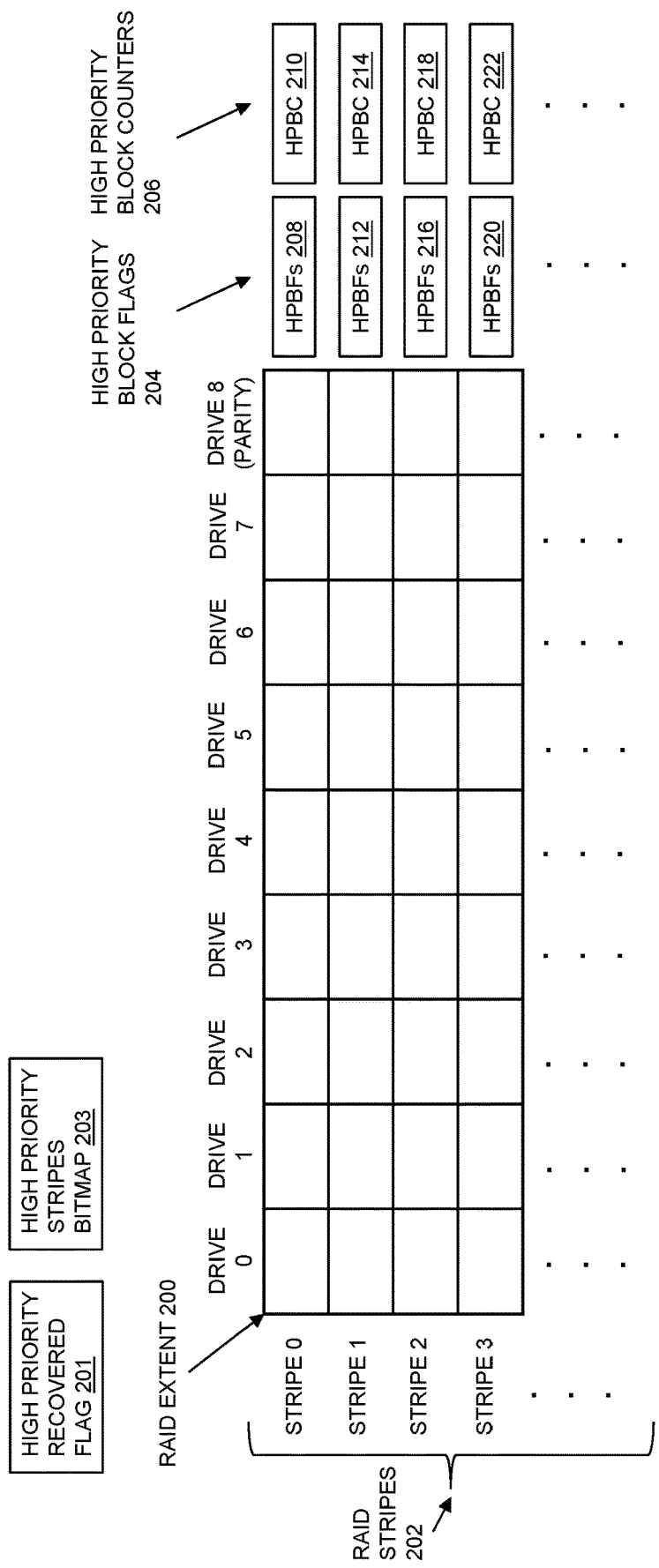
FIG. 2 is a block diagram showing an example of a RAID extent and associated data structures in an illustrative embodiment.

FIG. 2 is a block diagram showing an example of a RAID extent and associated data structures in an illustrative embodiment. The disclosed technology may be embodied or configured to use a standard RAID level to provide parity protection when storing host data indicated by the Host I/O Requests 112, e.g. RAID 5 or RAID 6. For each individual RAID extent, the RAID Logic 150 organizes fixed size blocks of physical non-volatile data storage that is allocated from Physical Non-Volatile Data Storage Drives 128 into a grid having N rows of logically contiguous RAID stripes, in which each column represents a separate physical storage drive from which physical non-volatile data storage blocks are allocated.

For example, in a case where K storage drives are used to store host data in a RAID 5 configuration, each RAID extent has K+1 total columns, representing K storage drives used to store host data plus one storage drive used to store parity information. In another example, also where K storage drives are used to store host data, but for a RAID 6 configuration, each RAID extent has K+2 total columns, representing K storage drives used to store host data and two storage drives used to store parity information.

Each RAID stripe has a predetermined capacity for storing compressed host data. For example, each RAID stripe may store a total of two megabytes (2 MB) of compressed host data. Fixed size blocks of host data are separately compressed (e.g. by Host I/O Request Processing Logic 134) to generate the compressed host data. For example, four kilobyte (4 KB) blocks of host data may be separately compressed to generate the compressed host data. In the case where 4 KB blocks of host data are separately compressed, and where each RAID stripe has the capacity to store a total of 2 MB of compressed host data, each RAID stripe may be used to store more than 512 4 KB blocks of uncompressed host data.

The RAID Extent 200 of FIG. 2 illustrates a RAID extent in an embodiment in which RAID 5 is used, with eight storage drives for storing host data (drives 0-7) and one storage drive for storing parity information (drive 8). Each block of physical non-volatile data storage allocated from each drive in drives 0-8 to individual ones of the RAID Stripes 202 is 256 KB of physical non-volatile data storage. In other words, for each one of the RAID Stripes 202, eight 256 KB blocks are allocated from drives 0-7 to store a total of 2 MB of compressed host data, and one 256 KB block of physical non-volatile data storage is allocated from drive 8 to store parity information.

Each RAID extent may be constructed from fixed size "slices" of physical non-volatile data storage, e.g. slices that are each four gigabytes (4 GB) in size. In an example where the capacity for storing compressed host data in RAID Extent 200 is 64 GB, a total of 8 GB (64 GB/8) would be used on each one of the drives that store compressed host data, i.e. on each one of drives 0-7, e.g. from two 4 GB slices located on each one of those drives. Two 4 GB slices on drive 8 would be used to store parity information. In such an example, the total capacity of RAID Extent 200 for storing host compressed data is 64 GB, and the total capacity of RAID Extent 200 for storing both compressed host data and parity information is 64 GB+8 GB=72 GB.

In some embodiments, the data storage system uses log-structured writes when storing host data, and each write operation to the Physical Non-Volatile Data Storage Drives 128 stores a full RAID stripe. When a block of host data within an existing RAID stripe is overwritten, the new compressed host data is written together with additional newly written compressed host data into a new, empty RAID stripe. The existing RAID stripe is not modified. Instead, the updated block of host data in the existing RAID stripe is marked as invalid.

Also shown in FIG. 2 is a High Priority Recovered Flag 201 for RAID Extent 200. High Priority Recovered Flag 201 is set during the RAID rebuild process in response to a determination that all data that was previously stored on the failed drive and located within all of the high priority RAID stripes in RAID Extent 200 has been recovered.

Also shown in FIG. 2 is a High Priority Stripes Bitmap 203. High Priority Stripes Bitmap 203 is a bitmap having set bits indicating which ones of the RAID Stripes 202 in RAID Extent 200 have been determined to be high priority.

Also shown in FIG. 2 are High Priority Block Flags 204. High Priority Block Flags 204 are sets of high priority block flags corresponding to each RAID stripe in RAID Stripes 202, e.g. HPBFs 208 for Stripe 0, HPBFs 212 for Stripe 1, HPBFs 216 for Stripe 2, HPBFs 220 for Stripe 3, and so on. The high priority block flags corresponding to a given RAID stripe include a high priority block flag that is set for each block of high priority host data that has been stored into the corresponding RAID stripe.

Also shown in FIG. 2 are High Priority Block Counters 206. High Priority Block Counters 206 include a high priority block counter corresponding to each RAID stripe in RAID Stripes 202, e.g. HPBC 210 for Stripe 0, HPBC 214 for Stripe 1, HPBC 218 for Stripe 2, HPBC 222 for Strip 3, and so on. The high priority block counter corresponding to a given RAID stripe stores a value equal to a total number of high priority blocks of host data that have been stored into the corresponding RAID stripe, e.g. a value equal to the total number of high priority block flags that are set for the corresponding RAID stripe.

Figure 3:
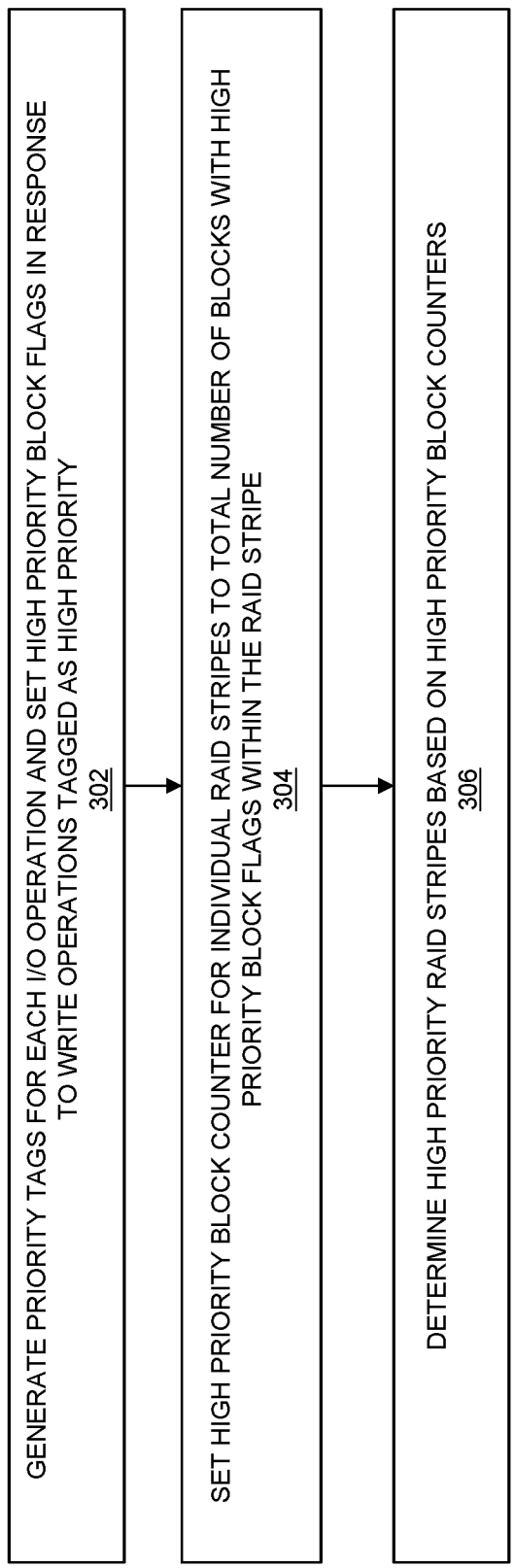
FIG. 3 is a flow chart showing an example of steps performed in some embodiments to maintain high priority block flags and high priority block counters, and to determine high priority RAID stripes.

FIG. 3 is a flow chart showing an example of steps performed in some embodiments to maintain high priority block flags and high priority block counters, and to determine high priority RAID stripes.

At step 302, priority tags are generated by hosts or by Storage Processor 120 for each write operation, e.g. for each write operation performed by Storage Processor 120 to store the host data indicated by write requests in Host I/O Requests 112 into Physical Non-Volatile Data Storage Drives 128. A priority tag generated at step 302 for a write operation indicates whether the host data written by the write operation is high priority data. High priority data may consist of or include data that is stored in a storage volume that a host has defined as a high priority storage volume. High priority data may additionally or alternatively consist of or include metadata.

Also at step 302, high priority block flags are set by Storage Processor 120 in response to the write operations that have been tagged as storing high priority data. For example, a high priority block flag is set for each block of host data stored in a corresponding RAID stripe by write operations tagged as high priority.

At step 304, the value of each high priority block counter for each individual RAID stripe is set to the total number of blocks of high priority host data that have been written to that RAID stripe. For example, when Storage Processor 120 (e.g. RAID Logic 150) prepares a RAID stripe to be stored into Physical Non-Volatile Data Storage Drives 128, it may set the value of the high priority block counter for the RAID stripe to be equal to the total number of blocks of high priority host data that have been written to that RAID stripe.

At step 306, the Storage Processor 120 determines the high priority RAID stripes for each RAID extent based on the values of the corresponding high priority block counters. For example, at the time each RAID stripe is de-staged from the Storage Processor 120 to Physical Non-Volatile Data Storage Drives 128, e.g. when a RAID stripe is flushed from Cache 146 to Physical Non-Volatile Data Storage Drives 128 or when a newly formed RAID stripe is stored to Physical Non-Volatile Data Storage Drives 128 by Garbage Collection Logic 147, the value of the high priority block counter for that RAID stripe is compared to a predetermined threshold. If the value of high priority block counter for the RAID stripe exceeds the predetermined threshold, then the RAID stripe is determined to be high priority, and a bit corresponding to the RAID stripe is set in the high priority stripe bitmap corresponding to the RAID extent that contains the RAID stripe. Also at the time the RAID stripe is de-staged to the Physical Non-Volatile Data Storage Drives 128, the high priority block counter and high priority block flags for the RAID stripe are stored to Physical Non-Volatile Data Storage Drives 128.

Figure 4:
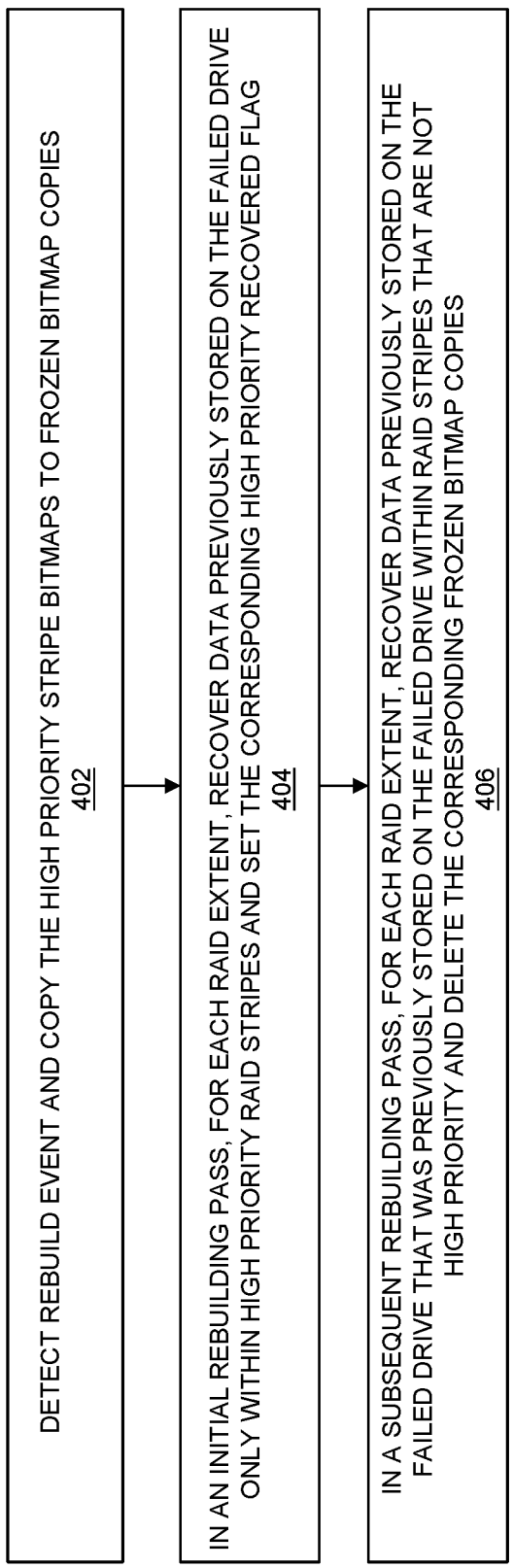
FIG. 4 is a flow chart showing an example of steps performed in some embodiments during the RAID rebuild process.

FIG. 4 is a flow chart showing an example of steps performed in some embodiments during the RAID rebuild process. The steps of FIG. 4 may be performed by Rebuild Logic 166.

At step 402, a rebuild event is detected, such as failure or removal of a drive in Physical Non-Volatile Data Storage Drives 128. Also at 402, in response to detection of the rebuild event, the high priority stripe bitmaps (e.g. High Priority Stripe Bitmaps 160) are copied to corresponding frozen bitmap copies (e.g. Frozen Bitmap Copies 162).

At step 404, an initial rebuilding pass is performed on each RAID extent, e.g. by Initial Rebuild Pass Logic 168. The initial rebuilding pass recovers data previously stored on the failed drive only within the high priority RAID stripes of each RAID extent. When performing the initial rebuilding pass on an individual RAID extent, the Initial Rebuild Pass Logic 168 sets the corresponding high priority recovered flag for that RAID extent after processing all the high priority RAID stripes in the RAID extent, i.e. after all host data previously stored on the failed drive and contained within all the high priority RAID stripes of the RAID extent has been recovered. The Initial Rebuild Pass Logic 168 then processes a next RAID extent similarly, and so on until the initial rebuilding pass has been performed on all the RAID extents, and all high priority recovered flags have accordingly been set.

At step 406, after completion of the initial rebuilding pass on all RAID extents, at least one subsequent rebuilding pass is performed, e.g. by Subsequent Rebuild Pass Logic 170. The subsequent rebuilding pass recovers data previously stored on the failed drive only contained within the RAID stripes of each RAID extent that are not high priority. After performing the subsequent initial rebuilding pass on each individual RAID extent, the Subsequent Rebuild Pass Logic 168 deletes the corresponding frozen bitmap copy in Frozen Bitmap Copies 162.

Figure 5:
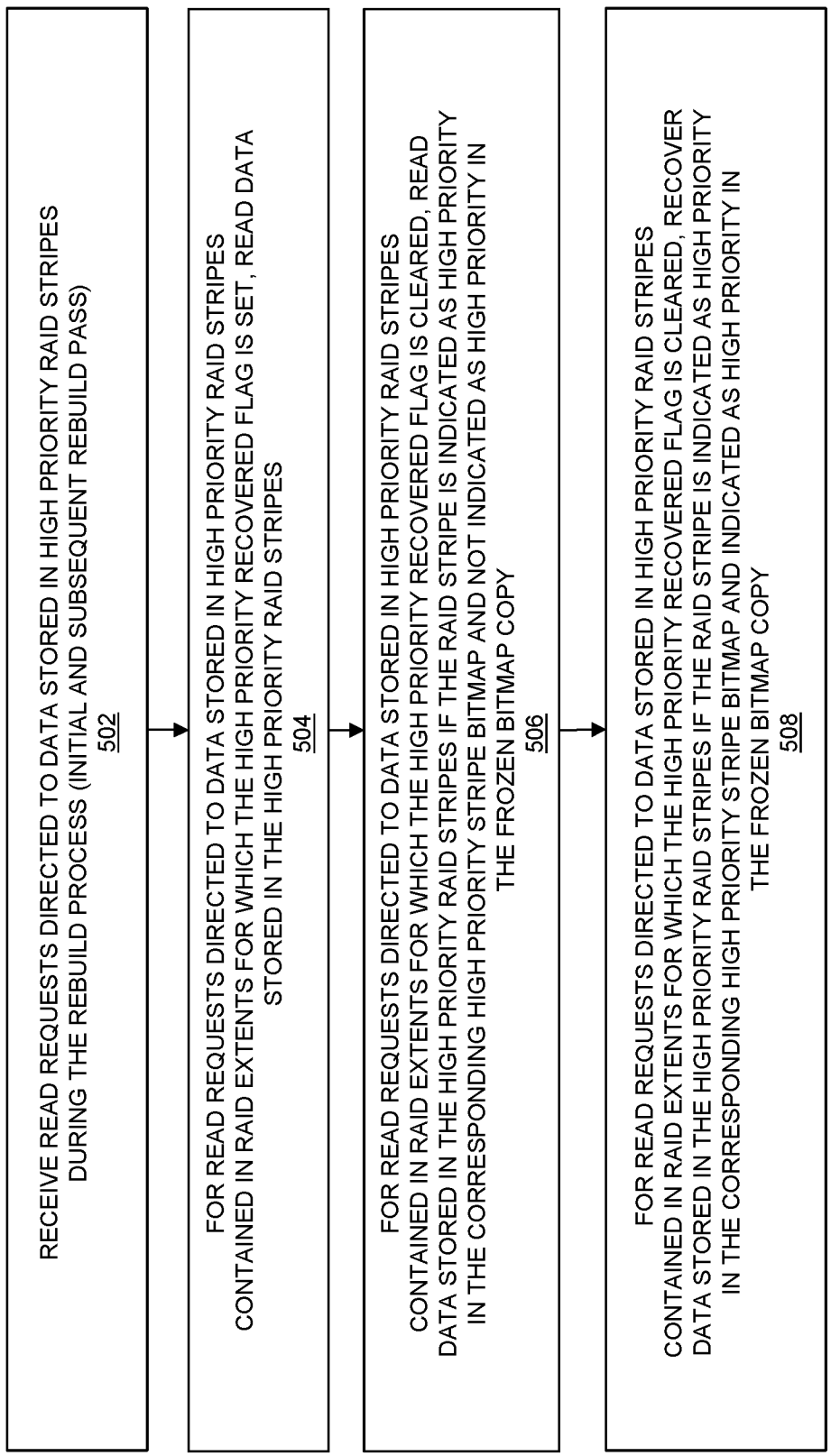
FIG. 5 is a flow chart showing an example of steps performed in some embodiments to process I/O read requests directed to data stored in high priority RAID stripes during the RAID rebuild process.

FIG. 5 is a flow chart showing an example of steps performed in some embodiments to process I/O read requests directed to data stored in high priority RAID stripes during the RAID rebuild process. The steps of FIG. 5 may, for example, be performed by the Host I/O Request Processing Logic 134 and/or RAID Logic 150.

At step 502, host I/O read requests that are directed to host data stored in high priority RAID stripes are received during the rebuild process, e.g. during the initial rebuilding pass performed by Initial Rebuild Pass Logic 168 and/or during the subsequent rebuilding pass performed by Subsequent Rebuild Pass Logic 170.

At step 504, for those of the host I/O read requests received at step 502 that are directed to data stored in high priority RAID stripes contained in RAID extents for which the high priority recovered flag is set, the data currently stored in the high priority RAID stripes is read directly from the RAID stripes, without having to recover any data previously stored on the failed drive, since any data previously stored in those RAID stripes has already been recovered for these RAID stripes. In this case, prioritized data such as metadata and/or host data stored in high priority storage volumes is advantageously not subject to degraded read performance during the rebuild process.

At step 506, for those of the host I/O read requests received at step 502 that are directed to data stored in high priority RAID stripes contained in RAID extents for which the high priority recovered flag is cleared, the data stored in the high priority RAID stripes is also read directly from those RAID stripes, without having to recover any data previously stored on the failed drive, if the RAID stripe is indicated as high priority in the high priority stripe bitmap corresponding to the RAID extent containing the RAID stripe and not indicated as high priority in the corresponding frozen bitmap copy. Such high priority RAID stripes were written during the rebuild process, after detection and replacement of the failed drive, and therefore do not contain host data stored on the failed drive. These RAID stripes can accordingly be read normally without requiring the recovery of data previously stored on the failed drive.

At step 508, for those of the host I/O read requests received at step 502 that are directed to data stored in high priority RAID stripes contained in RAID extents for which the corresponding high priority recovered flag is cleared, the data stored in those high priority RAID stripes is recovered using the data stored on the remaining drives and the parity information if the RAID stripe is indicated as high priority in both the high priority stripe bitmap corresponding to the RAID extent and in the corresponding frozen bitmap copy. The data previously stored on the failed drive and located in those RAID stripes has not yet been fully recovered by the initial rebuilding pass.

While the above description makes reference to high priority and non-high priority blocks of host data, the disclosed technology is not limited in this regard. Alternatively, the disclosed technology may be implemented using multiple data priorities, e.g. Priority-A, Priority-B, etc. In such alternative embodiments, the highest priority level of data blocks (e.g. Priority-A data blocks) stored on the failed drive would be recovered first, followed by the next highest priority data blocks (e.g. Priority-B data blocks), and so on until all data blocks stored on the failed drive had been recovered.

As will be appreciated by those skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:
organizing non-volatile data storage of a data storage system into a plurality of RAID extents, wherein each RAID extent comprises a plurality of logically contiguous RAID stripes;
for each block in each RAID stripe, maintaining a corresponding high priority block flag, wherein the high priority block flag is set when high priority user data is stored in the corresponding block;
maintaining a corresponding high priority block counter for each RAID stripe in each RAID extent by storing, in the high priority block counter, a total number of blocks in the RAID stripe that have corresponding high priority block flags that are currently set;
for each RAID stripe in each RAID extent, comparing a value of the corresponding high priority block counter to a threshold;
determining that those RAID stripes having corresponding high priority block counter values that exceed the threshold are high priority;
in response to detecting a failed drive in the data storage system, performing an initial rebuilding pass on each one of the RAID extents, wherein the initial rebuilding pass recovers data that was previously stored on the failed drive and was located within high priority RAID stripes in the RAID extent; and
after the initial rebuilding pass is completed on all of the RAID extents, performing at least one subsequent rebuilding pass on each one of the RAID extents that recovers data that was previously stored on the failed drive and was located within RAID stripes in the RAID extent that are not high priority.

2. The method of claim 1, further comprising:
for each RAID extent, maintaining a corresponding high priority recovered flag, wherein the high priority recovered flag is set when all data that was previously stored on the failed drive and that was located within all high priority RAID stripes in the RAID extent has been recovered; and
wherein read requests received prior to completion of the at least one subsequent rebuilding pass on each one of the RAID extents, and that are directed to high priority RAID stripes in RAID extents having corresponding high priority recovered flags that are set, are processed by reading the recovered data from the high priority RAID stripes.

3. The method of claim 1, further comprising:
generating high priority tags for write operations that write high priority data; and
wherein maintaining the high priority block flag for each block in each RAID stripe comprises setting high priority block flags corresponding to blocks written by write operations for which high priority tags were generated.

4. The method of claim 1, wherein generating the high priority tags for write operations that write high priority data includes generating high priority tags for write operations that write user data to high priority storage volumes.

5. The method of claim 4, wherein generating the high priority tags for write operations that write high priority data includes generating high priority tags for write operations that write metadata.

6. The method of claim 1, wherein determining that those RAID stripes having corresponding high priority block counter values that exceed the threshold are high priority is performed when data for individual RAID stripes is de-staged to non-volatile storage.

7. The method of claim 1, further comprising:
maintaining a bitmap corresponding to each RAID extent indicating which individual RAID stripes in the corresponding RAID extent have been determined to be high priority;
further in response to detecting the failed drive, creating a copy of each bitmap corresponding to each RAID extent, wherein the copy of the bitmap is not modified during the initial rebuilding pass and subsequent rebuilding pass, and wherein the bitmap indicating which individual RAID stripes have been determined to be high priority is modified during the initial rebuilding pass and subsequent rebuilding pass;
performing the initial rebuilding pass that recovers data that was previously stored on the failed drive and was located within high priority RAID stripes in each RAID extent using the copies of the bitmaps corresponding to the individual RAID extents to identify which individual RAID stripes are high priority within each RAID extent; and
deleting the copies of the bitmaps responsive to completion of the first rebuilding pass and the subsequent rebuilding pass on the corresponding RAID extents.

8. The method of claim 1, further comprising preferentially merging together RAID stripes that are high priority during garbage collection.

9. The method of claim 1, further comprising decrementing the high priority block counter corresponding to at least one RAID stripe responsive to a block in the RAID stripe corresponding to a currently set high priority block flag being overwritten.

10. A data storage system comprising:
processing circuitry and a memory;
a plurality of non-volatile data storage drives; and
wherein the memory has program code stored thereon, wherein the program code, when executed by the processing circuitry, causes the processing circuitry to:
organize non-volatile data storage of a data storage system into a plurality of RAID extents, wherein each RAID extent comprises a plurality of logically contiguous RAID stripes;
for each block in each RAID stripe, maintain a corresponding high priority block flag, wherein the high priority block flag is set when high priority user data is stored in the corresponding block;
maintain a corresponding high priority block counter for each RAID stripe in each RAID extent by storing, in the high priority block counter, a total number of blocks in the RAID stripe that have corresponding high priority block flags that are currently set;
for each RAID stripe in each RAID extent, compare a value of the corresponding high priority block counter to a threshold;
determine that those RAID stripes having corresponding high priority block counter values that exceed the threshold are high priority;
in response to detection of a failed drive in the data storage system, perform an initial rebuilding pass on each one of the RAID extents, wherein the initial rebuilding pass recovers data that was previously stored on the failed drive and was located within high priority RAID stripes in the RAID extent; and
after the initial rebuilding pass is completed on all of the RAID extents, perform at least one subsequent rebuilding pass on each one of the RAID extents that recovers data that was previously stored on the failed drive and was located within RAID stripes in the RAID extent that are not high priority.

11. The data storage system of claim 10, wherein the program code, when executed by the processing circuitry, further causes the processing circuitry to:
for each RAID extent, maintain a corresponding high priority recovered flag, wherein the high priority recovered flag is set when all data that was previously stored on the failed drive and that was located within all high priority RAID stripes in the RAID extent has been recovered; and
wherein read requests received prior to completion of the at least one subsequent rebuilding pass on each one of the RAID extents, and that are directed to high priority RAID stripes in RAID extents having corresponding high priority recovered flags that are set, are processed by reading the recovered data from the high priority RAID stripes.

12. The data storage system of claim 10, wherein the program code, when executed by the processing circuitry, further causes the processing circuitry to:
generate high priority tags for write operations that write high priority data; and
wherein the high priority block flag for each block in each RAID stripe are maintained at least in part by setting high priority block flags corresponding to blocks written by write operations for which high priority tags were generated.

13. The data storage system of claim 10, wherein the high priority tags are generated for write operations that write high priority data at least in part by generating high priority tags for write operations that write user data to high priority storage volumes.

14. The data storage system of claim 13, wherein generating the high priority tags for write operations that write high priority data includes generating high priority tags for write operations that write metadata.

15. The data storage system of claim 10, wherein the determination that those RAID stripes having corresponding high priority block counter values that exceed the threshold are high priority is performed when data for individual RAID stripes is de-staged to non-volatile storage.

16. A computer program product including a non-transitory computer readable medium having instructions stored thereon, wherein the instructions, when executed on processing circuitry, cause the processing circuitry to perform steps including:
organizing non-volatile data storage of a data storage system into a plurality of RAID extents, wherein each RAID extent comprises a plurality of logically contiguous RAID stripes;
for each block in each RAID stripe, maintaining a corresponding high priority block flag, wherein the high priority block flag is set when high priority user data is stored in the corresponding block;
maintaining a corresponding high priority block counter for each RAID stripe in each RAID extent by storing, in the high priority block counter, a total number of blocks in the RAID stripe that have corresponding high priority block flags that are currently set;

for each RAID stripe in each RAID extent, comparing a value of the corresponding high priority block counter to a threshold;

determining that those RAID stripes having corresponding high priority block counter values that exceed the threshold are high priority;

in response to detecting a failed drive in the data storage system, performing an initial rebuilding pass on each one of the RAID extents, wherein the initial rebuilding pass recovers data that was previously stored on the failed drive and was located within high priority RAID stripes in the RAID extent; and after the initial rebuilding pass is completed on all of the RAID extents, performing at least one subsequent rebuilding pass on each one of the RAID extents that recovers data that was previously stored on the failed drive and was located within RAID stripes in the RAID extent that are not high priority.

\* \* \* \* \*